(12) United States Patent
Kitagawa et al.

(10) Patent No.: US 10,649,293 B2
(45) Date of Patent: May 12, 2020

(54) DISPLAY DEVICE

(71) Applicant: SHARP KABUSHIKI KAISHA, Sakai, Osaka (JP)

(72) Inventors: Hideki Kitagawa, Sakai (JP); Tohru Daitoh, Sakai (JP); Hajime Imai, Sakai (JP); Yoshihito Hara, Sakai (JP); Masaki Maeda, Sakai (JP); Toshikatsu Itoh, Sakai (JP); Tatsuya Kawasaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/147,583

(22) Filed: Sep. 29, 2018

(65) Prior Publication Data

US 2019/0101804 A1 Apr. 4, 2019

(30) Foreign Application Priority Data

Oct. 3, 2017 (JP) ................................. 2017-193311

(51) Int. Cl.
| | |
|---|---|
| *G09G 1/00* | (2006.01) |
| *G02F 1/1362* | (2006.01) |
| *G02F 1/1345* | (2006.01) |
| *G02F 1/1333* | (2006.01) |
| *G02F 1/1343* | (2006.01) |

(52) U.S. Cl.
CPC ...... *G02F 1/136286* (2013.01); *G02F 1/1345* (2013.01); *G02F 1/13338* (2013.01); *G02F 1/13452* (2013.01); *G02F 1/134309* (2013.01); *G02F 2001/13456* (2013.01); *G02F 2201/121* (2013.01); *G02F 2201/123* (2013.01)

(58) Field of Classification Search
CPC .......... G06F 3/045; G06F 3/041; G06F 3/044; G09G 3/00
See application file for complete search history.

(56) References Cited

U.S. PATENT DOCUMENTS

| | | | |
|---|---|---|---|
| 2016/0041665 A1* | 2/2016 | Gwon | G06F 3/044 345/174 |
| 2016/0109747 A1* | 4/2016 | Nodera | G02F 1/133345 349/43 |
| 2016/0349559 A1* | 12/2016 | Woo | G02F 1/13338 |

FOREIGN PATENT DOCUMENTS

JP 2016-038594 A 3/2016

\* cited by examiner

*Primary Examiner* — Michael A Faragalla
(74) *Attorney, Agent, or Firm* — ScienBiziP, P.C.

(57) ABSTRACT

A display panel includes a substrate, pixel electrodes, switching components, an electrode, a line, a terminal, an insulating film, and a conductive film. The switching components are disposed in a layer lower than the pixel electrodes. The electrode is disposed in a layer different from a layer in which the pixel electrodes are disposed. The line includes sections disposed in a layer lower than the switching components in a display area. The terminal is disposed in a layer upper than the line in a non-display area. The insulating film includes a section disposed between the line and the switching components in the display area and a section disposed between the terminal and the substrate in the non-display area. The conductive film is disposed on the insulating film in a layer between the line and the terminal to connect the line to the terminal.

4 Claims, 6 Drawing Sheets

DISPLAY DEVICE

CROSS REFERENCE TO RELATED APPLICATION

This application claims priority from Japanese Patent Application No. 2017-193311 filed on. Oct. 3, 2017. The entire contents of the priority application are incorporated herein by reference.

TECHNICAL FIELD

The technology described herein relates to a display device.

BACKGROUND

A display device having touch panel function produced with the in-cell technology has been known. The display device includes a substrate, position detection electrodes (touch electrodes), pixel electrodes, and a driver (a source driving touch sensing IC) that are provided on the substrate. The position detection electrodes are electrically connected to the driver via position detection lines (touch routing lines). An example of such a display device is disclosed in Japanese Patent Application Publication No. 2016-38594.

In recent years, improvement in definition (resolution of display panels is expected. To improve the definition of a display panel, the display panel requires a larger number of lines on a substrate with higher density. In layout design of position detection lines, the position detection lines need to be routed not co contact other lines (e.g., source lines and gate lines), that is, flexibility in the designing decreases.

SUMMARY

The technology described herein was made in view of the above circumstances. An object is to provide a display panel including lines that are connected to electrodes and less likely to contact other lines.

A display panel includes A display panel includes a substrate, pixel electrodes, switching components, at least one electrode, at least one line, at least one terminal, at least one insulating film, and at least, one conductive film. The substrate includes a display area in which an image is displayed and a non-display area adjacent to the display area. The pixel electrodes are disposed in the display area. The switching components are disposed in a layer lower than the pixel electrodes in the display area and electrically connected to the pixel electrodes, respectively. The at least one electrode is disposed in a layer different from a layer in which the pixel electrodes are disposed in the display area. The at least one line is disposed on the substrate. The at least one line includes a section disposed in a layer lower than the switching components in the display area. The at least one terminal is disposed in a layer upper than the at least one line in the non-display area. The at least one terminal electrically connects the at least one line to an electric device. The at least one insulating film is disposed to cross a boundary between the display area and the non-display area. The at least one insulating film includes a section disposed between the at least one line and the switching components in the display area and a section disposed between the at least one terminal and the substrate in the non-display area. The at least one conductive film is disposed on the insulating film in a layer between the at least one line and the at least one terminal to extend from the at least one line to the at least one terminal to connect the at least one line to the at least one terminal.

Because the at least one line is disposed in the layer lower than the switching components, the at least one line is less likely to contact other lines connected to the switching components. Therefore, flexibility in layout design of the lines increases. The at least one line is connected to the at least one terminal via the conductive film. In comparison to a configuration in which an insulating film is not disposed between a terminal and a substrate, the insulating film may have a step in a section on which the conductive film is disposed and the conductive film has a step along the step of the insulating film. According to the configuration, a possibility of break of the conductive film increases. In the display panel according to the technology described herein, the insulating film is disposed to cross the boundary between the display area and the non-display area. Therefore, the conductive film is less likely to have a step and thus less likely to break.

According to the technology described herein, the lines connected to the electrodes are less likely to contact other lines.

DETAILED DESCRIPTION

Figure 1:
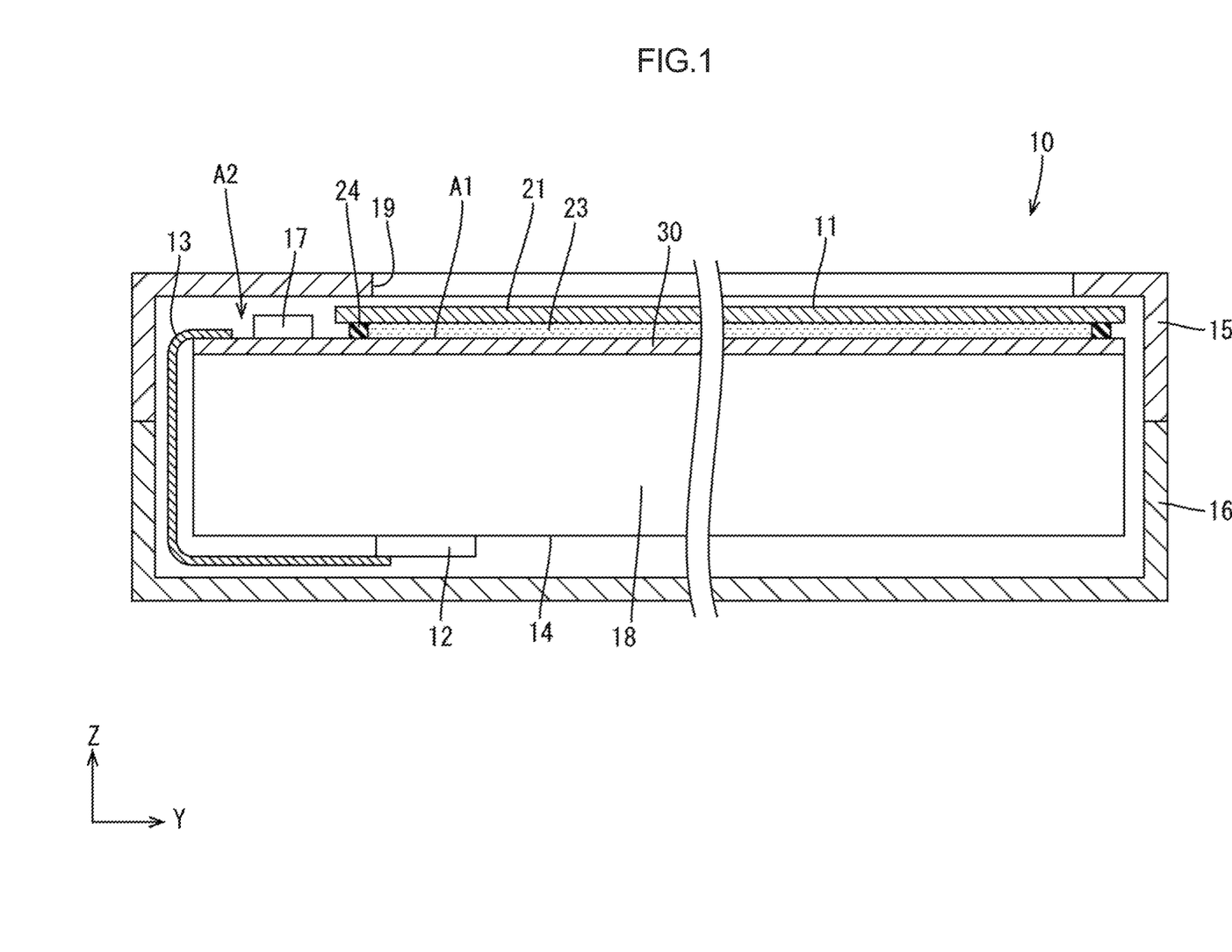
FIG. 1 is a cross-sectional view of a liquid crystal display device according to a first embodiment along the longitudinal direction (the Y-axis direction) of the liquid crystal display device.

An embodiment win be described with reference to FIGS. 1 to 6. As illustrated in FIG. 1, a liquid crystal display device 10 includes a liquid crystal panel 11 (a display panel), a control circuit board 12 (an external signal source), and a flexible circuit board 13 (an external component connecting member), and a backlight unit 14 (a lighting device). The liquid crystal panel 11 includes a driver 17. The control circuit board 12 is configured to supply various input signals to the driver 17. The flexible circuit board 13 electrically connects the liquid crystal panel 11 to the control circuit board 12. The backlight unit 14 is an external light source configured to supply light to the liquid crystal panel 11. As illustrated in FIG. 1, the backlight unit 14 includes a chassis 18, a light source, and an optical member. The chassis 18 has a box shape with an opening on the front side (closer to the liquid crystal panel 11). The light source is disposed inside the chassis 18. The light source may include cold cathode fluorescent tubes, LEDs, or organic light-emitting diodes. The optical member is disposed to cover the opening of the chassis 18. The optical member has a function for converting light emitted by the light source into planar light. The liquid crystal panel 11 includes a display area A1 for display images and a non-display area A2 that surrounds the display area A1.

As illustrated in FIG. 1, the liquid crystal display device 10 further includes a front exterior component 15 and a rear exterior component 16. The liquid crystal panel 11 and the backlight unit 14 are attached to each other and held in a space defined by the front exterior component 15 and the rear exterior component 16. The front exterior component 15 includes an opening 19 through which images displayed in the display area A1 are viewed. An application of the liquid crystal display device 10 includes various electronic devices such as portable phones (including smartphones), notebook personal computers (including tablet personal computers), wearable terminals (including smartwatches), portable information terminals (including electronic book players and PDAs), portable video game players, and digital photo frames.

As illustrated in FIG. 1, the liquid crystal panel 11 includes substrates 21 and 30, a liquid crystal layer 23 (a medium layer), and a sealant 24. The substrates 21 and 30 are opposed to each other. The liquid crystal layer 23 includes liquid crystal molecules that are substances having optical characteristics that alter according to application of an electric field. The sealant 24 is disposed between the substrates 21 and 30 to surround the liquid crystal layer 23 and to seal the liquid crystal molecules in a space defined by the substrates 21 and 30 and the sealant 24. One of the substrates 21 and 30 on the front side (the upper side in FIG. 1) is a CF substrate 21 (a common substrate). The other one of the substrates 21 and 30 on the rear side (the back side) is an array substrate 30 (an active matrix substrate, a component-side substrate). The liquid crystal molecules included in the liquid crystal layer 23 are horizontally oriented. The orientation of the liquid crystal molecules is not limited to the horizontal orientation. Polarizing plates are attached to outer surfaces of the substrates 21 and 30. The CF substrate 21 includes a glass substrate, a color filter, an overcoat film, and an alignment film. The color filter, the overcoat film, and the alignment film are disposed on top of each other on the inner surface of the substrate (on the liquid crystal layer 23 side). The color filter includes red (R), green (C), and blue (B) segments arranged in a matrix. The color segments are opposed to pixels on the array substrate 30.

Figure 2:
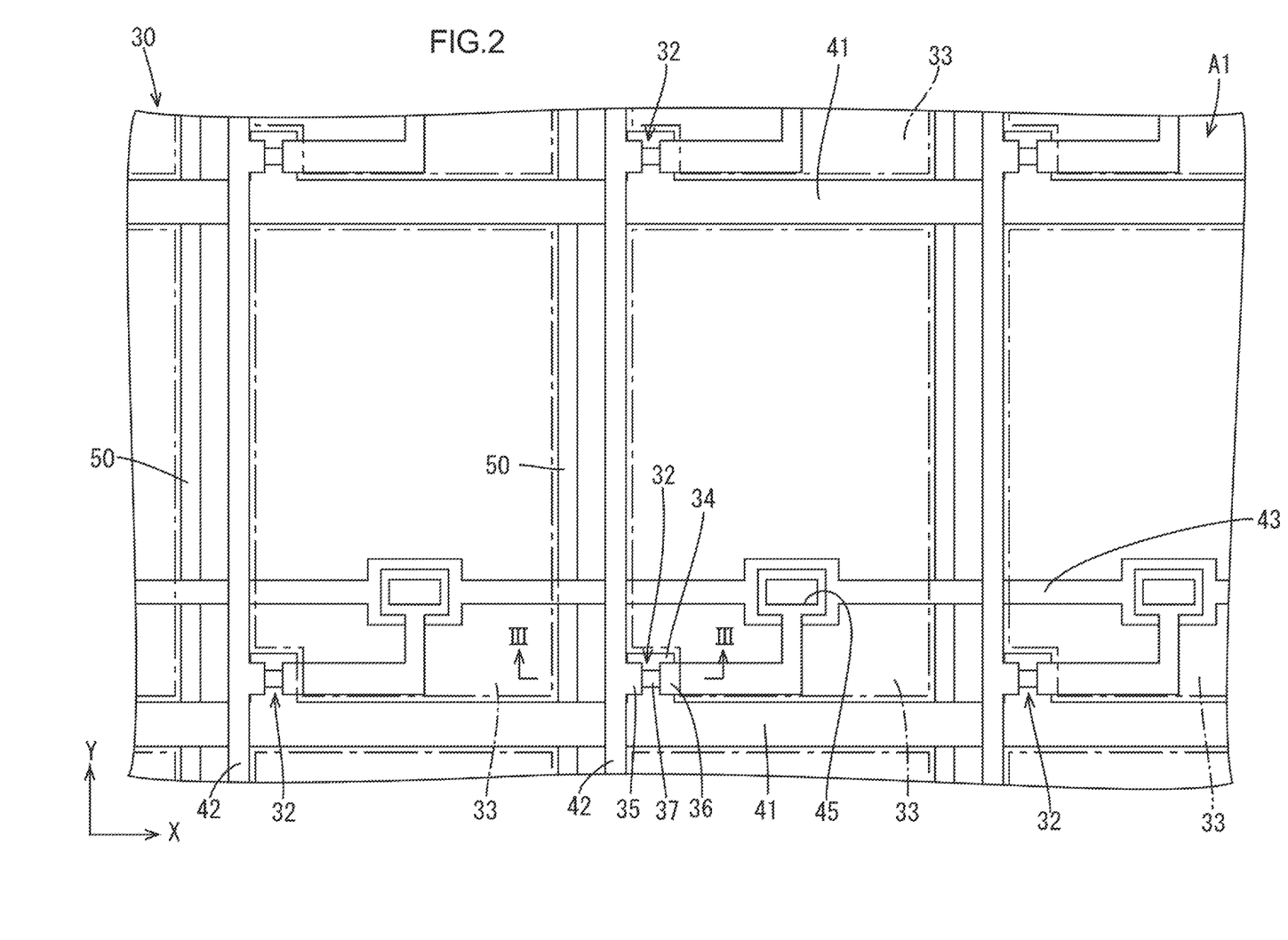
FIG. 2 is a plan view illustrating a display area of an array substrate.
Figure 3:
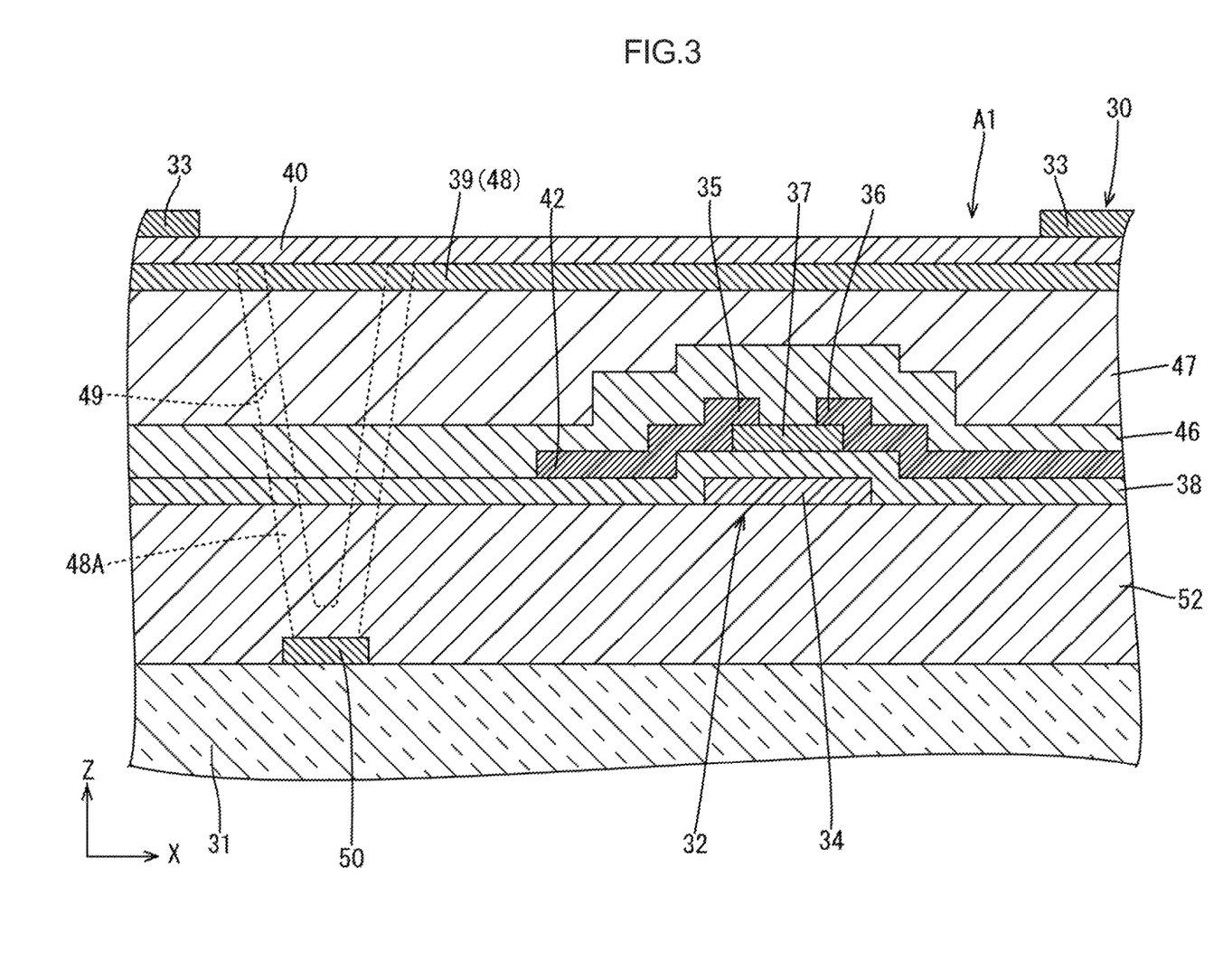
FIG. 3 is a cross-sectional view along line III-III in FIG. 2 illustrating the array substrate.
Figure 4:
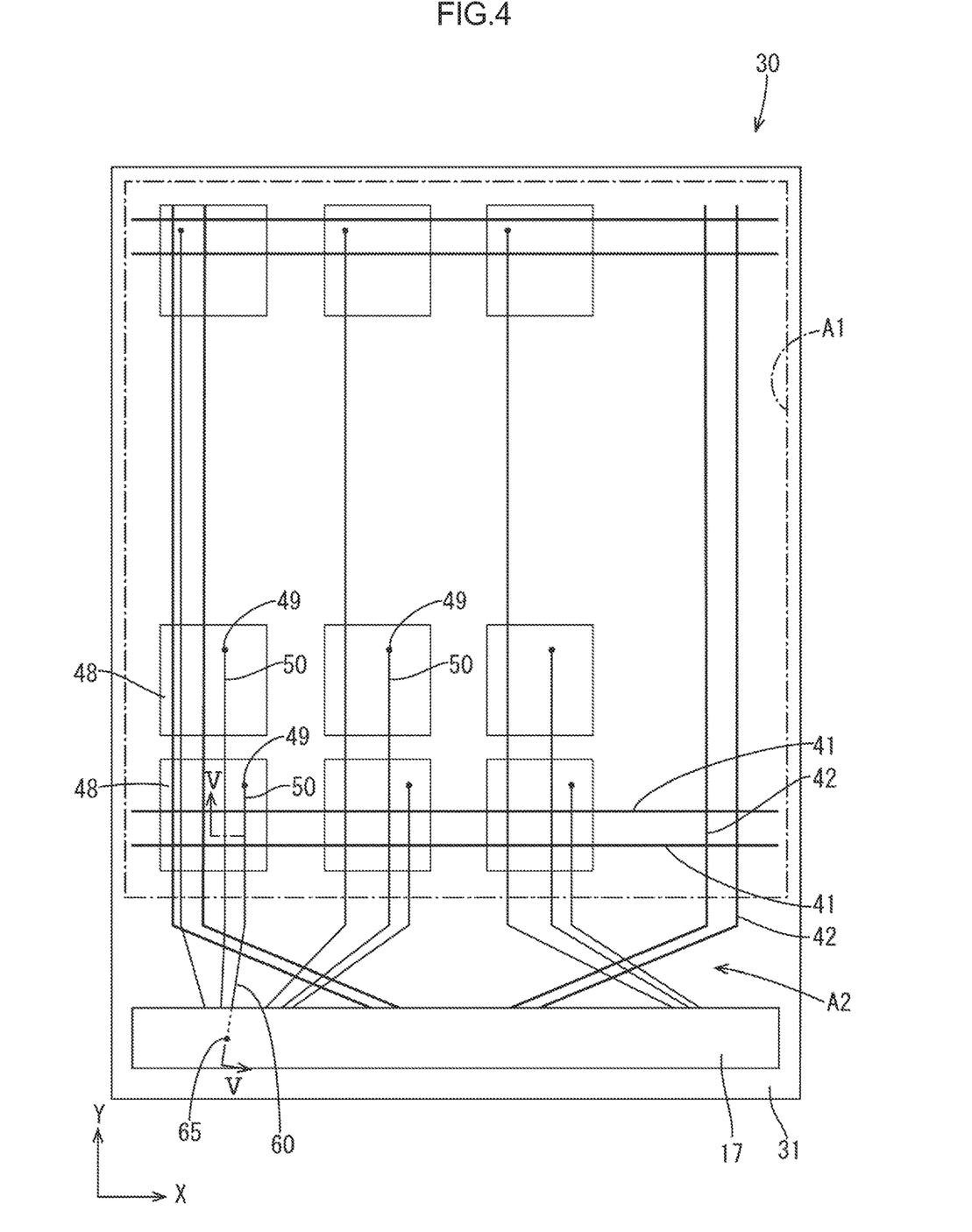
FIG. 4 is a plan view schematically illustrating the array substrate.

As illustrated in FIGS. 2 and 3, the array substrate 30 includes a glass substrate 31 and multiple layers formed on top of each other on the inner surface of the glass substrate 31 using a photolithography method. As illustrated in FIG. 4, the driver 17 (a panel driver) for driving the liquid crystal panel 11 is disposed in an area of the glass substrate 31 closer to one of edges of the glass substrate 31 (a section of the non-display area A2 adjacent to the display area A1). As illustrated in FIG. 2, thin film transistors (TFTs) 32 (display components) and pixel electrodes 33 are disposed in a matrix on the inner surface of the glass substrate 31 (on the liquid crystal layer 23 side, the upper side in FIG. 3) in the display area A1. The TFTs 32 are switching components. The TFTs 32 are disposed in a layer lower than a layer in which the pixel electrodes 33 are disposed and connected to the pixel electrodes 33, respectively. The TFTs 32 include gate electrodes 34, source electrodes 35, drain electrodes 36, and channels 37.

As illustrated in FIG. 3, each channel 37 is disposed to overlap the corresponding gate electrode 34 and insulated from the gate electrode 34 with a gate insulating film 38 disposed between the channel 37 and the gate electrode 84. Namely, the gate insulating film 38 is disposed between gate lines 41 and source lines 42. Each channel 37 connects the corresponding source electrode 35 to the corresponding drain electrode 36. An interlayer insulating film 46 is disposed in a layer upper than the channels 37, the source electrodes 35, and the drain electrodes 36. A planarization film 47 is disposed on the interlayer insulating film 46. A common electrode 39 is disposed on the planarization film 47. The pixel electrodes 33 are disposed on the common electrode 39 on the front side. An interlayer insulating film 40 is disposed between the pixel electrodes 33 and the common electrode 39. The drain electrodes 36 are electrically connected to the pixel electrodes 33 via contact holes 45 illustrated in FIG. 2. Each of the gate insulating film 38 and the interlayer insulating films 40 and 46 is constructed from, but not limited to, a laminated film including a silicon dioxide (SiO2) layer and a silicon nitride (SiNx) layer.

The gate electrodes 34, the source electrodes 35, and the drain electrodes 36 are constructed from, but not limited to, laminated films, each of which includes a titanium (Ti) layer and a copper (Cu) layer. As illustrated in FIG. 2, the gate lines 41 and the source lines 42 are routed in a grid to surround the TFTs 32 and the pixel electrodes 33. The gate electrodes 34 are connected to the gate lines 41. The source electrodes 35 are connected to the source lines 42. Ends of the source lines 42 closer to the driver 17 are connected to the driver 17. With the source lines 42, the source electrodes 35 are electrically connected to the driver 17. The gate lines 41 are connected to the driver 17. With the gate lines 41, the gate electrodes 34 are electrically connected to the driver 17.

The TFTs 32 are driven based on signals supplied by the driver 17 via the gate lines 41 and the source lines 42. Application of voltages to the pixel electrodes 33 is controlled according to the driving of the TFTs 32. The array substrate 30 includes capacitance lines 43 (Cs lines) which extend in the X-axis direction. The capacitance lines 43 are made of the same material as that of the gate lines 41. The capacitance lines 43 and the gate lines 41 are formed in the same layer in the same step. The capacitance lines 43 and the pixel electrodes 33 form capacitors to hold potentials charged at the pixel electrodes 33 for a predefined period.

The common electrode 39 includes slits. When each pixel electrode 33 is charged, a potential difference is created between the pixel electrode 33 and the common electrode 39. A fringe electric field (an oblique electric field) is generated between an opening edge of the slit of the common electrode 39 and the pixel electrode 33 including a component along the date surface of the array substrate 30 and a component in a normal direction to the plate surface of the array substrate 30. Using the fringe electric field, the orientation of the liquid crystal molecules in the liquid crystal layer 23 can be controlled. Namely, the liquid crystal panel 11 operates in fringe field switching (FFS) mode.

The liquid crystal display device 10 is an in-cell type liquid crystal display device having a display function for displaying images and a touch panel function (a position detection function) for detecting positions of input by a user performed according to the images displayed in the display area A1. The touch panel uses a projected-capacitive touch panel technology, for instance, a self-capacitive technology. As illustrated in FIG. 4, position detection electrodes 48 (touch electrodes) are disposed in a matrix within the plate surface of the array substrate 30. The common electrode 39 includes the position detection electrodes 48.

The position detection electrodes 48 (electrodes) are disposed in a layer lower than the layer in which the pixel electrodes 33 are disposed in an area of the glass substrate 31 in the display area A1. When the user of the liquid crystal display device 10 brings his or her fingertip (a position input member) to the surface (the display surface) of the liquid crystal panel 11, a capacitor is formed between the fingertip and the position detection electrode 48 because fingertip is a conductor. A capacitance of the capacitor between the fingertip and the position detection electrode 48 adjacent to the fingertip and measured at the position detection electrode 48 is different from capacitances measured at the position detection electrodes 48 farther from the fingertip. According to the difference, the position of input by the fingertip can be detected. The position detection electrodes 48 include sections 48A that are connected to position detection lines 50 via contact holes 49 (see FIG. 3). In FIG. 3, the position detection electrodes 48 are directly connected with the position detection lines 50. However, the position detection electrodes 48 may be connected to the position detection lines 50 via a conductive film for forming source electrodes or drain electrodes (a source metal or a drain metal) or a conductive film for forming a gate electrodes (a gate metal).

As illustrated in FIG. 4, the position detection lines 50 (lines) extend from the position detection electrodes 48 toward the driver 17. The position detection lines 50 are electrically connected to the driver 17. To detect positions of input using the position detection electrodes 48, the control circuit board 12 supplies drive signals to the position detection electrodes 48 via the driver 17 and the position detection lines 50 and receives detection signals from the position detection electrodes 48 via the driver 17 and the position detection lines 50. Namely, the driver 17 is configured to supply the drive signals to the position detection electrodes 48 to control the position detection electrodes 48. The driver 17 is electrically connected to the pixel electrodes 33 via the gate lines 41 and the source lines 42. To display images, the driver 17 supplies drive signals to the pixel electrodes 33 to control the pixel electrodes 33. The gate lines 41 include lead lines. The gate lines 41 are electrically connected to the driver 17 via the lead lines. The source lines 42 extend such that the ends of the source lines 42 closer to the driver 17 bend toward each other in a plan view as illustrated in FIG. 4.

As illustrated in FIG. 2, the position detection lines 50 extend along the source lines 42 in the plan view. As illustrated in FIG. 3, the position detection lines 50 are formed on the surface of the glass substrate 31. The position detection lines 50 are disposed in the layer lower than the TFTs 32, more specifically, lower than the gate electrodes 34, namely, the closest to the glass substrate 31 (the lowest layer). A SOG film 52, which is an insulating film, is disposed between the position detection lines 50 and the TFTs 32. A CAP film is disposed between the SOG film 52 and the gate insulating film 38. Another CAP film is disposed between the SOG film 52 and the glass substrate 31 and the position detection lines 50. The SOG film 52 is a silicon oxide film formed by applying a glassy solution mixed with an organic solution to a top surface of the CAP film 51 through spin coating and heating. The CAP films are made of the same material as that of the gate insulating film 38 or the interlayer insulating films 40 and 46 (e.g., SiO2 and SiNx).

Figure 5:
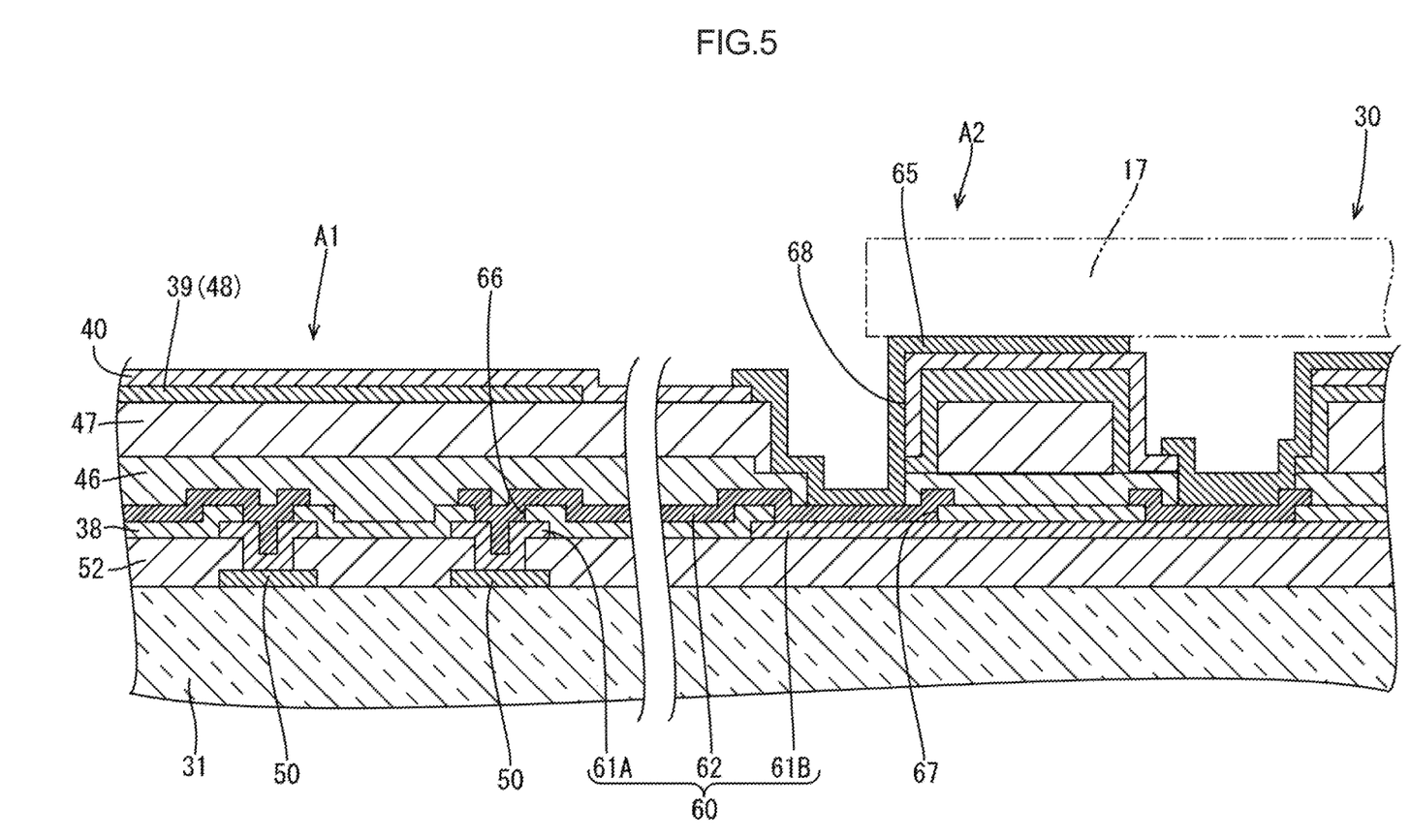
FIG. 5 is a cross-sectional view along line V-V in FIG. 4 illustrating a boundary between a display area and a non-display area.
Figure 6:
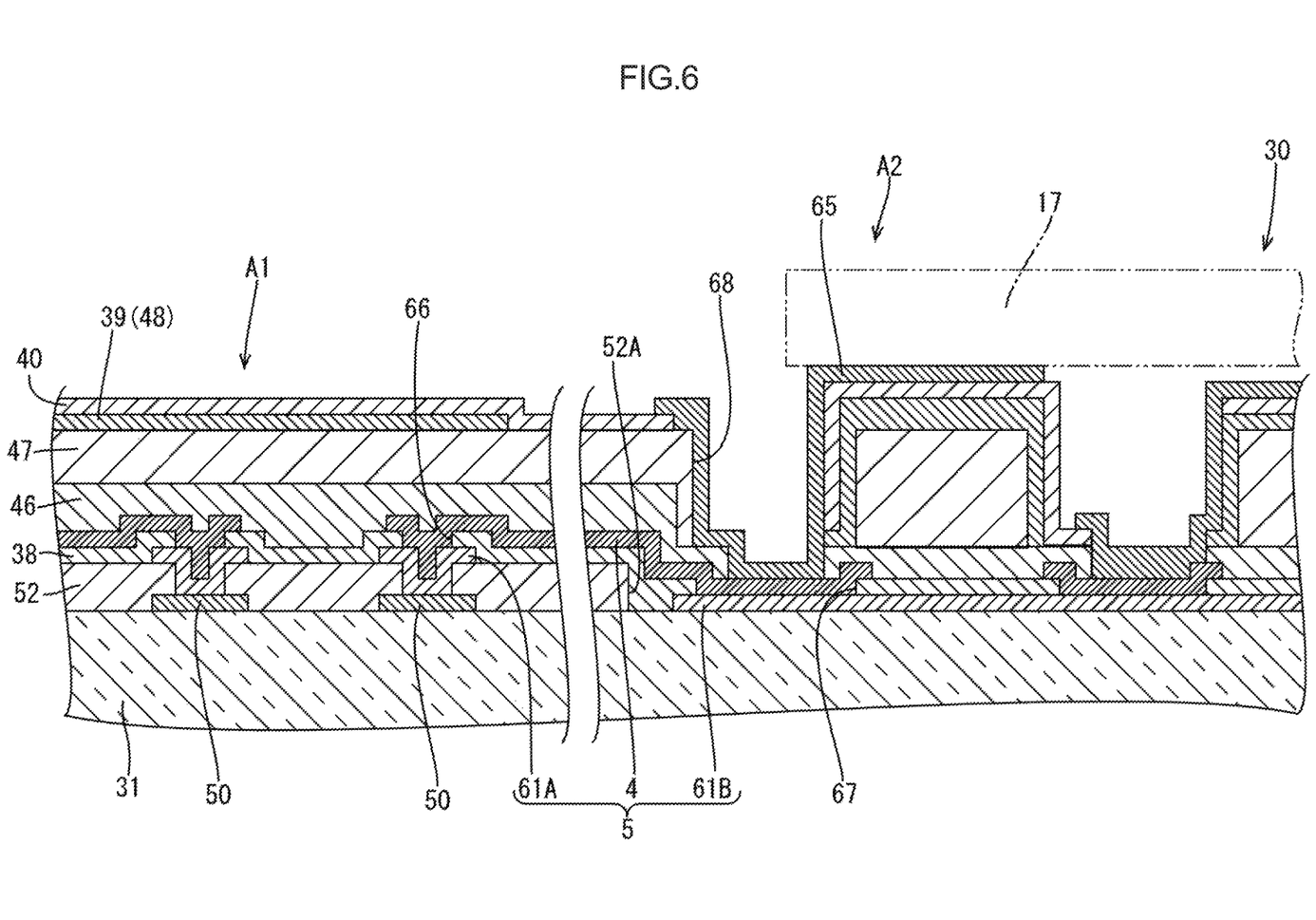
FIG. 6 is a cross-sectional view illustrating a boundary between a display area and non-display area in a comparative example.

As illustrated in FIG. 5, the position detection lines 50 are electrically connected to terminals 65 via a conductive 60 disposed between the position detection lines 50 and the terminals 65. The terminals 65 are for electrically connecting the position detection, lines 50 to the driver 17 (an electrical device) disposed in the non-display area A2. The driver 17 is connected to the terminals 65 from the front side. The terminals 65 are disposed in a layer upper than the position detection lines 50 on the glass substrate 31. Specifically, the terminals 65 are disposed in the layer in which the pixel electrodes 33 are disposed. The terminals 65 are made of the same material as that of the pixel electrodes 33. The pixel electrodes 33, the position detection electrodes 48, the terminals 65 are constructed from a transparent electrode film such as an indium tin oxide (ITO) film and an indium zinc oxide (IZO) film. The conductive film 60 is disposed in a layer between the SOG film 52 and the terminals 65. A large portion of the conductive film 60 is disposed on the SOG film 52 (in a layer upper than the SOG film 52). The conductive film 60 extends from the position detection lines 50 to the terminals 65. The SOG film 52 is disposed to cross the boundary between the display area A1 and the non-display area A2. A section of the SOG film 52 in the display area A1 is disposed between the position detection lines 50 and the TFTs 32. A section of the SOG film 52 in the non-display area A2 is disposed between the terminals 65 and the glass substrate 31. The SOC film 52 includes a top surface that is planar.

The conductive film 60 includes first conductive films 61A and 61B and a second conductive film 62. The first conductive films 61A and 61B are disposed in the layer in which the gate lines 41 are disposed. The first conductive films 61A and 61B are made of the same material as that of the gate lines 41. The second conductive film 62 is disposed in the layer in which the source lines 42 are disposed. The second conductive film 62 is made of the same material as that of the source lines 42. The first conductive film 61A is electrically connected to the second conductive film 62 via contact holes 66 in the gate insulating film 38 (gate insulating film-side contact holes). The first conductive film 61B is electrically connected to the second conductive film 62 via contact holes 67 in the gate insulating film 38 (gate insulating film-side contact holes). The second conductive film 62 is connected to the terminals 65 via contact holes 68 in the interlayer insulating film 40, the planarization film 47, and the interlayer insulating film 46.

Effects will be described. Because the position detection lines 50 are disposed in the layer lower than the TFTs 32, the position detection lines 50 are less likely to contact the gate lines 41 and the source lines 42 (other lines) connected to the TFTs 32. Therefore, flexibility in layout design of the position detection lines 50 increases. In this embodiment, the position detection lines 50 are connected to the terminals 65 via the conductive film 60. In an array substrate 3 included in a comparative example illustrated in FIG. 6, the SOG film 52 is not disposed between the glass substrate 31 and the terminals 65. In the array substrate 3, the SOG film 52 includes steps 52A under a conductive film 5 that extends from the position detection lines 50 to the terminals 65. A second conductive film 4 of the conductive film 5 is disposed along the steps of the SOG film 52 and thus the second conductive film 4 is more likely to break. In this embodiment, the SOG film is disposed to cross the boundary between the display area A1 and the non-display area A2. Therefore, the SOG film 52 and the conductive film 60 are less likely to have steps and thus the conductive film 60 is less likely to break.

This embodiment includes the gate lines 41, the source lines 42, and the gate insulating film 38. The gate lines 41 and the source lines are connected to the TFTs 32. The gate insulating film 38 is disposed between the gate lines 41 and the source lines 42. The conductive film 60 includes the first conductive films 61A and 61B and the second conductive film 62. The first conductive films 61A and 61B are disposed in the layer in which the gate lines 41 are disposed. The first conductive films 61A and 61B are made of the same material as that of the gate lines 41. The second conductive film 62 is disposed in the layer in which the source lines 42 are disposed. The second conductive film 62 is made of the same material as that of the source lines 42. The first conductive films 61A and 61B are electrically connected to the second conductive film 62 via the contact holes 66 and 67 in the gate insulating film 38. Therefore, the conductive film 60 can be formed in a gate line 41 forming process and a source line 42 forming step. Because the conductive film 60 includes the first conductive film 61A and the second conductive film 62, a thickness of the conductive film 60 increases, resulting in a reduction in resistance of the conductive film 60.

The SOG film 52 can be easily planarized. Therefore, the SOG film 52 is preferable for an underlayer for the TFTs 32. The terminals 65 are disposed in the layer in which the pixel electrodes 33 are disposed and constructed from the transparent electrode film from which the pixel electrodes 33 are constructed. Therefore, the terminals 65 can be formed in a pixel electrode 33 forming process.

Other Embodiments

The technology described herein is not limited to the embodiments described above and with reference to the drawings. The following embodiments may be included in the technical scope.

(1) Examples of the electrodes and the lines according to the technology described herein are not limited to the position detection electrodes 48 and the position detection lines 50. A configuration without the position detection electrodes 48 may be included in the technical scope. Examples of the electrodes and the lines according to the technology described herein include a common electrode and lines connected to the common electrode.

(2) Different types of insulating films may be disposed between the position detection lines 50 and the TFTs 32.

(3) The position detection lines 50 may be disposed in any layer between the glass substrate 31 and the TFTs 32.

(4) Conductive films and insulating films made of materials other than those in the above embodiments may be formed on the glass substrate 31.

(5) The configuration of the conductive film 60 is not limited to the configuration described in the embodiment section. The conductive film 60 may include a single conductive film.

(6) The electric device connected to the terminal 65 is not limited to the driver 17. An inspection device for sending and receiving inspection signals to the liquid crystal panel 11 may be connected to the terminals 65.

(7) The conductive film 60 may be disposed within the non-display area A2 and ends of the position detection lines 50 may be disposed in the non-display area A2.

The invention claimed is:

1. A display panel comprising:
a substrate including a display area in which an image is displayed and a non-display area adjacent to the display area;
pixel electrodes disposed in the display area;
switching components disposed in a layer lower than the pixel electrodes in the display area and electrically connected to the pixel electrodes, respectively;
at least one first electrode disposed in a layer different from a layer in which the pixel electrodes are disposed in the display area;
at least one line disposed on the substrate and including a section disposed in a layer lower than the switching components in the display area;
at least one terminal disposed in a layer upper than the at least one line in the non-display area and electrically connecting the at least one line to an electric device;
at least one insulating film disposed to cross a boundary between the display area and the non-display area and including a section disposed between the at least one line and the switching components in the display area and a section disposed between the at least one terminal and the substrate in the non-display area;
at least one conductive film disposed on the insulating film in a layer between the at least one line and the at least one terminal to extend from the at least one line to the at least one terminal to connect the at least one line to the at least one terminal,
gate lines connected to the switching components;
source lines connected to the switching components; and
a gate insulating film disposed between the gate lines and the source lines,
wherein the conductive film includes:
a first conductive film disposed in a layer in which the gate lines are disposed and made of material same as material of the gate lines; and
a second conductive film disposed in a layer in which the source lines are disposed and made of material same as material of the source lines, and
the first conductive film is electrically connected to the second conductive film via a gate insulating film-side contact hole in the gate insulating film.

2. The display panel according to claim 1, wherein
the at least one first electrode includes position detection electrodes disposed in the display area and configured to detect a position of input by a position inputting member, and
the at least one line includes position detection lines electrically connected to the position detection electrodes.

3. The display panel according to claim 1, wherein the insulating film includes a SOG film.

4. The display panel according to claim 1, wherein the at least one terminal is disposed in the layer in which the pixel electrodes are disposed and made of material same as material of the pixel electrodes.

* * * * *